US 6,690,270 B2

(12) United States Patent
Lee

(10) Patent No.: US 6,690,270 B2
(45) Date of Patent: Feb. 10, 2004

(54) APPARATUS AND METHOD FOR ALARMING DANGER WHEN AN AUTOMOBILE IS CORNERING ON A DOWNHILL ROAD

(75) Inventor: Hyeong-Keun Lee, Kwangmyeong-shi (KR)

(73) Assignee: Kia Motors Corporation, Seoul (KR)

( * ) Notice: Subject to any disclaimer, the term of this patent is extended or adjusted under 35 U.S.C. 154(b) by 207 days.

(21) Appl. No.: 10/029,878

(22) Filed: Dec. 31, 2001

(65) Prior Publication Data
US 2003/0100986 A1 May 29, 2003

(30) Foreign Application Priority Data
Nov. 23, 2001 (KR) ........................................ 2001-73259

(51) Int. Cl.$^7$ ............................ B60Q 7/00; B60R 25/10; G08B 21/00; G06F 79/00; G06F 7/00
(52) U.S. Cl. .................... 340/439; 340/425.5; 340/429; 340/438; 340/689; 701/70; 701/72
(58) Field of Search ............................... 340/425.5, 429, 340/431, 438, 440, 441, 439, 689; 701/70, 72

(56) References Cited
U.S. PATENT DOCUMENTS

| | | | |
|---|---|---|---|
| 5,825,284 A | * | 10/1998 | Dunwoody et al. .......... 340/440 |
| 6,169,946 B1 | * | 1/2001 | Griessbach .................. 701/45 |
| 6,212,455 B1 | * | 4/2001 | Weaver ....................... 701/45 |
| 6,438,463 B1 | * | 8/2002 | Tobaru et al. ................. 701/1 |
| 6,438,464 B1 | * | 8/2002 | Woywod et al. ............... 701/1 |

* cited by examiner

Primary Examiner—Jeffery Hofsass
Assistant Examiner—Lam Pham
(74) Attorney, Agent, or Firm—Birch, Stewart, Kolasch & Birch, LLP

(57) ABSTRACT

Disclosed are an apparatus and a method for alarming danger when an automobile is cornering on a downhill road. The apparatus has a speed sensor, a road wheel angle sensor, a steering angle sensor, first and second inclination detecting sections, a judgment section, and an alarming section. In the method, whether speed of the automobile is above a predetermined value or not is determined, and then whether the automobile is cornering on a downhill road or not is determined. When the automobile is cornering on a downhill road, whether the cornering is safely in progress or not is determined, from the road wheel angle, the speed of the automobile, and the longitudinal and transverse inclinations. When the cornering is unsafely in progress, it is notified to a driver of the automobile.

3 Claims, 3 Drawing Sheets

APPARATUS AND METHOD FOR ALARMING DANGER WHEN AN AUTOMOBILE IS CORNERING ON A DOWNHILL ROAD

BACKGROUND OF THE INVENTION

1. Field of the Invention

The present invention relates to an apparatus and a method for alarming danger when an automobile is cornering on a downhill road.

2. Description of the Prior Art

In general, when an automobile goes around a curve in a road, a driver of the automobile turns the automobile by operating a steering wheel, thereby turning the road wheels operatively connected with the steering wheel. When an automobile goes around a curve as described above, that is, when an automobile is cornering, it is important to properly control a turning angle of the steering wheel (hereinafter, referred to as "steering angle") and speed of the automobile. The reason is that, because centrifugal force is applied to the automobile while the automobile is cornering, when the steering angle or speed of the automobile is not properly controlled, the state of the automobile may become unstable and in extreme cases the automobile may go off the road, causing an accident.

Especially, when the automobile is cornering on a downhill road, the danger as described above becomes more severe since the weight of the automobile accelerates the automobile.

However, the driver of the automobile has to depend on the driver's own feel and experience in reducing the speed of the automobile and operating the steering wheel, thereby cornering the automobile. Therefore, there is a high possibility of an accident due to the driver's improper control of the automobile, when it is difficult for the driver to exactly access the status of the road due to external causes, for example, when the driver is not experienced in driving the automobile or is driving in the rain or in the dark.

SUMMARY OF THE INVENTION

Accordingly, the present invention has been made to solve the above-mentioned problems occurring in the prior art, and an object of the present invention is to provide an apparatus and a method, which can alarm danger to a driver of an automobile when the automobile is not properly controlled in consideration of the state of the automobile while the automobile is cornering on a downhill road.

In order to accomplish this object, there is provided an apparatus for alarming danger when an automobile is cornering on a downhill road, the apparatus comprising: speed sensor for detecting speed of the automobile; a road wheel angle sensor for detecting a road wheel angle; a steering angle sensor for detecting a steering angle; a first inclination detecting section for detecting a longitudinal inclination of the automobile; a second inclination detecting section for detecting a transverse inclination of the automobile; a judgment section for judging whether the automobile is running safely in cornering on a downhill road or not, based on values detected by the speed sensor, the road angle sensor, and the first and second inclination detecting sections, the judgment section applying an alarming signal when the automobile is judged as cornering without safety; and an alarming section for notifying a driver of the automobile when an alarming signal is applied from the judgment section.

In accordance with another aspect of the present invention, there is provided a method for alarming danger when an automobile is cornering on a downhill road, the method comprising the steps of: determining whether speed of the automobile is above a predetermined value or not; determining whether the automobile is cornering on a downhill road or not; when the automobile is cornering on a downhill road, determining whether the cornering is safely in progress or not, from the road wheel angle, the speed of the automobile, and the longitudinal and transverse inclinations; and notifying a driver of the automobile when the cornering is unsafely in progress.

In this case, in the step of determining whether the automobile is cornering on a downhill road or not, longitudinal and transverse inclinations of a frame of the automobile are detected and then compared with predetermined values.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings.

Figure 1:
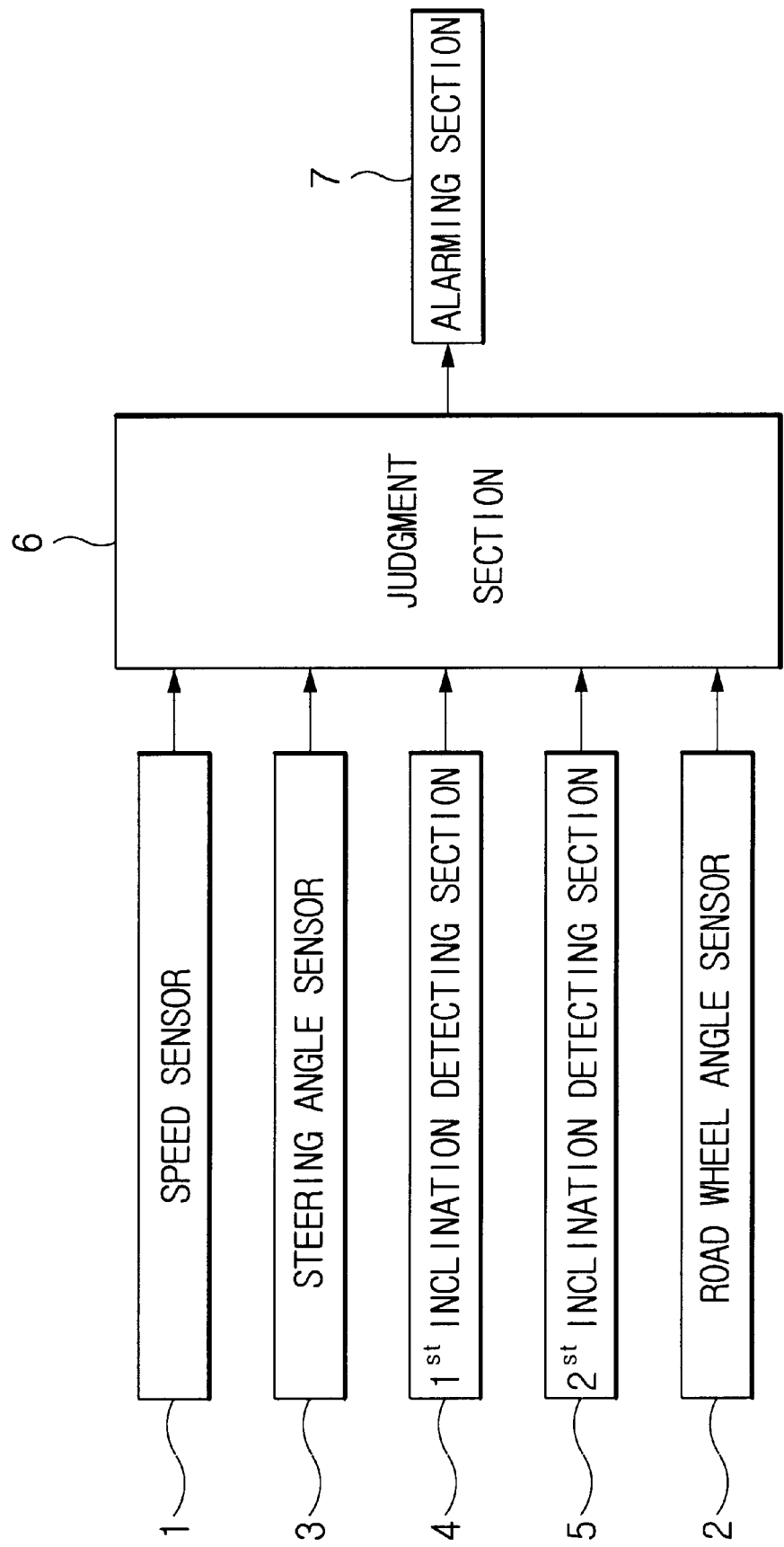
FIG. 1 is a block diagram for showing the construction of an apparatus for alarming danger when an automobile is cornering on a downhill road, according to an embodiment of the present invention.

FIG. 1 is a block diagram for showing the construction of an apparatus for alarming danger when an automobile is cornering on a downhill road, according to an embodiment of the present invention.

As shown, the apparatus according to an embodiment of the present invention includes a speed sensor 1, a road wheel angle sensor 2, a steering angle sensor 3, first and second inclination detecting sections 4 and 5, a judgment section 6, and an alarming section 7.

The speed sensor 1 detects the speed of an automobile. The road wheel angle sensor 2 may be installed to a pitman arm and detects the angle or displacement of a road wheel shaft, thereby detecting an angle $\Theta w$, which the road wheel makes with respect to the longitudinal direction of a frame of the automobile, that is, a steered angle of the road wheel.

The steering angle sensor 3 detects the steering angle $\Theta s$ of the steering wheel for steering the road wheels.

The first and second inclination detecting sections 4 and 5 respectively detect a longitudinal inclination $\Delta 1$ of the automobile, that is, an inclination of the automobile in the longitudinal direction of the automobile, and a transverse inclination $\Delta 2$ of the automobile, that is, an inclination of the automobile in the transverse direction of the automobile. The first inclination detecting section 4 includes a pair of height sensors, first and second height sensors, respectively disposed at an engine room at a front portion of the frame of the automobile and at a trunk at a rear portion of the frame of the automobile. The first inclination detecting section 4 detects the longitudinal inclination $\Delta 1$ of the automobile by means of a difference between heights of front and rear portions of the frame of the automobile detected by the height sensors.

The second inclination detecting section 5 includes another pair of height sensors, third and fourth height sensors, respectively disposed at left and right sides of the frame of the automobile. The second inclination detecting section 5 detects the transverse inclination Δ2 of the automobile by means of a difference between heights of left and right sides of the frame detected by the height sensors.

The judgment section 6 judges if the automobile is running safely when cornering on a downhill road, on the basis of values detected by the speed sensor 1, the road angle sensor 2, and the first and second inclination detecting sections 4 and 5. The judgment section 6 applies an alarming signal when it is judged as not being safe.

Figure 2:
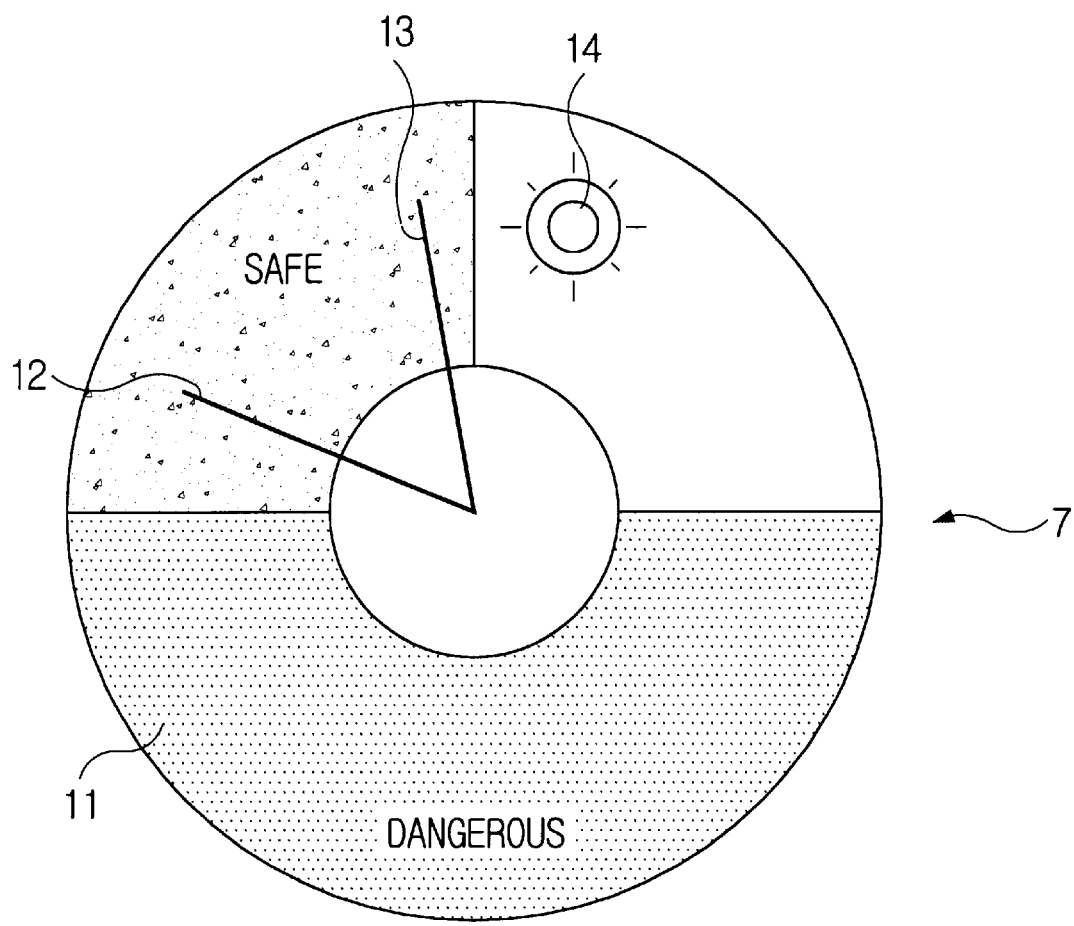
FIG. 2 is a view for showing an example of an alarming section employed in an apparatus according to an embodiment of the present invention.

The alarming section 7 notifies the driver when an alarming signal is applied from the judgment section 6 and may employ a warning lamp or a warning buzzer. Otherwise, as shown in FIG. 2, the alarming section 7 may include a circular indication panel 11, on which a safety sector and a danger sector are drawn, a pair of indicators 12 and 13, which indicate a current steering angle Θs and an anticipated steering angle Θs0 for safety, and an alarming lamp 14 for warning danger.

Figure 3:
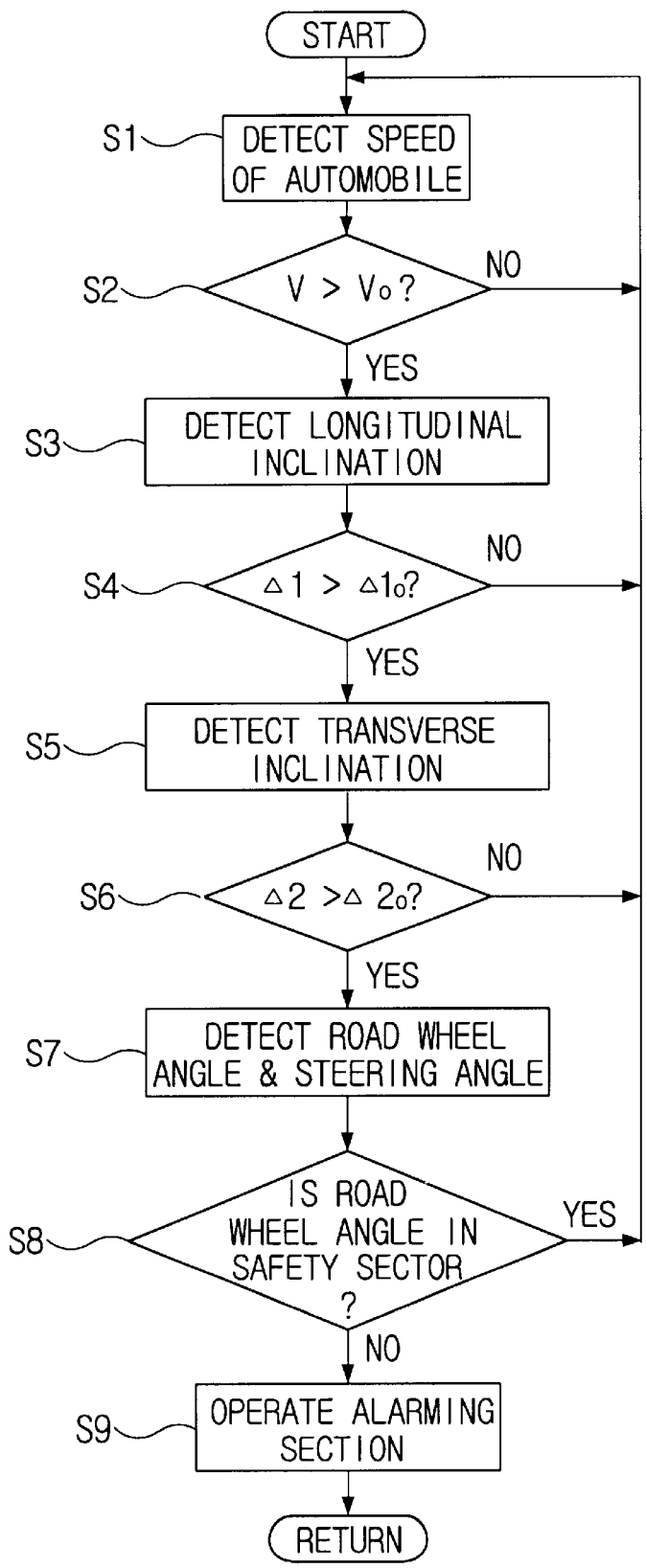
FIG. 3 is a flow chart of a method for alarming danger when an automobile is cornering on a downhill road, according to an embodiment of the present invention.

Hereinafter, a method for alarming danger when an automobile is cornering on a downhill road, according to an embodiment of the present invention, by means of the apparatus as described above, will be described with reference to a flow chart shown in FIG. 3.

First, speed of the automobile is initially detected by the speed sensor 1 (S1), and then whether the detected speed of the automobile is faster than a reference speed $V_0$ or not is judged (S2). In this case, it is preferred that the reference speed $V_0$ is 50 Km/h.

Next, whether the automobile is cornering on a downhill road or not is judged. That is, the longitudinal and transverse inclinations Δ1 and Δ2 are detected by the first and second inclination detecting sections 4 and 5 and then are judged whether they are larger than predetermined values $Δ1_0$ and $Δ2_0$ (S3 to S6). In this case, steps S3 to S6 may be carried out in order as shown in FIG. 3, or steps S4 and S6 may be carried out after steps S3 and S5 are carried out.

In step S4, when the longitudinal inclination Δ1 of the automobile detected by the first inclination detecting section 4 is at least 25% of a maximum value and the front portion of the frame of the automobile is lower than the rear portion of the frame of the automobile, it is judged as that the car is running on a downhill road. In step S6, when the transverse inclination Δ2 of the automobile detected by the second inclination detecting section 5 is at least 25% of a maximum value, it is judged as that the car is cornering.

When it is judged through the above steps that the automobile is cornering on a downhill road, the road wheel angle Θ and the steering angle Θs are detected respectively by the road wheel angle sensor 2 and the steering angle sensor 3 (S7).

Thereafter, whether the cornering is safely in progress or not is judged. That is, whether the road wheel angle Θw in consideration of the speed V of the automobile and the longitudinal and transverse inclinations Δ1 and Δ2 detected in the above steps is in the safety range or not is judged (S8). The safety range of the road wheel angle Θw according to the speed V of the automobile and the longitudinal and transverse inclinations Δ1 and Δ2 is obtained through experiments and stored in advance in the judgment section 6 in a form of a map.

When the road wheel angle Θw is out of the safety range as a result of the judgment in step 8, the alarming section 7 is operated to notify the driver that the automobile is cornering on a downhill road unsafely (S9).

It is preferred that, after a difference between the current road wheel angle Θw and a road wheel angle in the safety range is obtained, a steering angle $Θs_0$ to be adjusted from the current steering angle Θs in order to make the road wheel angle Θw come into the safety range is estimated based on the difference, and then the steering angle $Θs_0$ to be adjusted and the current steering angle Θs are displayed on the alarming section as shown in FIG. 2. The driver can recognize the steering angle $Θs_0$ to be adjusted to enable the automobile to safely corner on a downhill road from the two indicators displayed on the alarming section 7 and can operate the steering wheel making the road wheel angle Θw come into the safety range.

According to the apparatus and method of the present invention as described above, a driver can be notified of danger together with a proper steering angle to be adjusted when an automobile is not properly steered while cornering on a downhill road. Therefore, the apparatus and the method of the present invention can prevent car accidents.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for alarming danger when an automobile is cornering on a downhill road, the apparatus comprising:

a speed sensor for detecting speed of the automobile;

a road wheel angle sensor for detecting a road wheel angle;

a steering angle sensor for detecting a steering angle;

a first inclination detecting section for detecting a longitudinal inclination of the automobile;

a second inclination detecting section for detecting a transverse inclination of the automobile;

a judgment section for judging whether the automobile is running safely in cornering on a downhill road or not, based on values detected by the speed sensor, the road angle sensor, and the first and second inclination detecting sections, the judgment section applying an alarming signal when the automobile is judged as cornering without safety; and an alarming section for notifying a driver of the automobile when an alarming signal is applied from the judgment section.

2. A method for alarming danger when an automobile is cornering on a downhill road, the method comprising the steps of:

determining whether speed of the automobile is above a predetermined value or not;

determining whether the automobile is cornering on a downhill road or not;

when the automobile is cornering on a downhill road, determining whether the cornering is safely in progress or not, from the road wheel angle, the speed of the automobile, and the longitudinal and transverse inclinations; and notifying a driver of the automobile when the cornering is unsafely in progress.

3. A method as claimed in claim 2, wherein, in the step of determining whether the automobile is cornering on a downhill road or not, longitudinal and transverse inclinations of a frame of the automobile are detected and then compared with predetermined values.

* * * * *